US011310267B2

(12) United States Patent
Dash et al.

(10) Patent No.: US 11,310,267 B2
(45) Date of Patent: Apr. 19, 2022

(54) SECURE CHANNEL STATE INFORMATION WITH ADAPTIVE OBFUSCATION

(71) Applicant: SEMICONDUCTOR COMPONENTS INDUSTRIES, LLC, Phoenix, AZ (US)

(72) Inventors: Debashis Dash, Newark, CA (US); Hossein Dehghan, Diablo, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 231 days.

(21) Appl. No.: 16/808,587

(22) Filed: Mar. 4, 2020

(65) Prior Publication Data

US 2020/0344260 A1     Oct. 29, 2020

Related U.S. Application Data

(60) Provisional application No. 62/840,371, filed on Apr. 29, 2019.

(51) Int. Cl.
| | |
|---|---|
| *G06F 21/00* | (2013.01) |
| *H04L 29/06* | (2006.01) |
| *G06F 21/60* | (2013.01) |
| *H04L 5/04* | (2006.01) |
| *H04L 5/12* | (2006.01) |

(Continued)

(52) U.S. Cl.
CPC ........ *H04L 63/1475* (2013.01); *G06F 21/606* (2013.01); *H04L 5/04* (2013.01); *H04L 5/12* (2013.01); *H04W 12/02* (2013.01); *H04W 12/63* (2021.01)

(58) Field of Classification Search
CPC ......... H04L 63/1475; H04L 5/04; H04L 5/12; H04L 2209/80; H04L 9/0875; H04L 9/12; H04L 27/2613; H04L 25/0228; G06F 21/606; H04W 12/02; H04W 12/63; H04B 7/0417; H04B 7/0617; H04B 7/0456; H04K 1/003
See application file for complete search history.

(56) References Cited

U.S. PATENT DOCUMENTS 6,088,354 A * 7/2000 Lenell ................... H04J 3/0608
                                                        370/389
6,449,271 B1 * 9/2002 Lenell ................... H04J 3/0608
                                                        370/383

(Continued)

FOREIGN PATENT DOCUMENTS

EP         3364678 A1 * 8/2018 ........... H04L 1/0001

*Primary Examiner* — Kendall Dolly
(74) *Attorney, Agent, or Firm* — Ramey LLP (57) ABSTRACT

A privacy-enhancing wireless communication method for use by a transmitting wireless device having a first location, the method comprising: obtaining a frame preamble using a transceiver device at a location, wherein the frame preamble includes a predetermined pattern and wherein movement information corresponding to the location is detectable based on channel state information of the transceiver device in accordance with the pre-determined pattern; modifying the predetermined pattern of the frame preamble to include amplitude or phase distortion; and masking the movement information by transmitting, using the transceiver device, a frame including the frame preamble with the modified predetermined pattern.

20 Claims, 9 Drawing Sheets

(51) Int. Cl.
*H04W 12/02* (2009.01)
*H04W 12/63* (2021.01)

(56) References Cited

U.S. PATENT DOCUMENTS

| | | | |
|---|---|---|---|
| 7,337,250 B1 * | 2/2008 | Davis | G06F 13/4204 |
| | | | 710/110 |
| 9,647,736 B1 | 5/2017 | Schelstraete | |
| 2018/0173589 A1 * | 6/2018 | Chang | G06F 21/14 |
| 2019/0341988 A1 | 11/2019 | Schelstraete et al. | |

* cited by examiner

SECURE CHANNEL STATE INFORMATION WITH ADAPTIVE OBFUSCATION

CROSS-REFERENCE TO RELATED APPLICATION

This application claims priority benefit of U.S. provisional application No. 62/840,371, which was filed on Apr. 29, 2019, and which is entirely incorporated by reference herein.

FIELD

This application pertains generally to wireless communications between electronic devices and wireless sensing, and particularly to wireless communications in which channel state information (CSI) is adaptively obfuscated to camouflage aspects of wireless communications and sensing.

BACKGROUND

Home, outdoor, and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video disc players, security cameras and smoke detectors to one another and to the Cable or Subscriber Line through which Internet, video, and television is delivered to the home. Most WAPs implement the IEEE 802.11 standard which is a convention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "be", etc. Communications follow a hub and spoke model with a WAP at the hub and the spokes corresponding to the wireless links to each 'client' device.

The IEEE 802.11n and above standards support increasing degrees of complexity in the signal processing required of fully compliant WLAN nodes including beamforming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon. Beamforming typically requires the knowledge of the channel state and hence involves estimating the channel state information. The channel state information by itself can be used to infer information about the wireless environment. While communications using such IEEE standards can be encrypted such that the data portion of such communications cannot be decrypted by eavesdroppers, the headers and additionally the nature and existence of the communications themselves can nevertheless provide useful information to eavesdroppers. Thus, there is room for improvement in the art.

SUMMARY

An example of this disclosure includes a privacy-enhancing wireless communication method comprising obtaining a frame preamble using a transceiver device at a location, wherein the frame preamble includes a predetermined pattern and wherein movement information corresponding to the location is detectable based on channel state information of the transceiver device in accordance with the predetermined pattern; modifying the predetermined pattern of the frame preamble to include amplitude or phase distortion; and masking the movement information by transmitting, using the transceiver device, a frame including the frame preamble with the modified predetermined pattern.

In at least one example of this disclosure, modifying the predetermined pattern includes introducing a time delay or phase shifts between antenna streams, spatial streams or I/Q streams. In some examples, the time delays or phase shifts vary according to time.

Another example of this disclosure includes a transmitting wireless device comprising: one or more antennas; a processor coupled to the one or more antennas; and a memory storing instructions executable by the processor, wherein the instructions comprise instructions to: obtain a frame preamble, wherein the frame preamble includes a predetermined pattern and wherein movement information corresponding to the location is detectable based on channel state information of the transmitting wireless device in accordance with the pre-determined pattern; modify the predetermined pattern of the frame preamble to include amplitude or phase distortion; and mask the movement information by transmitting, using the one or more antennas, a frame including the frame preamble with the modified predetermined pattern. In at least one example of this disclosure, modifications to the frame elements vary over time. In at least one example, the frame elements are modified so as to emulate a physical change in the environment of the wireless device.

DETAILED DESCRIPTION

The following detailed description provides further details of the figures and example implementations of the present disclosure. Some reference numerals and descriptions of redundant elements between figures are omitted for clarity. Terms used throughout the description are explanatory, not limiting.

Throughout this disclosure, terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Throughout this disclosure, the term "coupled" includes any type of connection, wired or wireless, in which data may be communicated. The term "coupled" includes, but is not limited to, a connection between devices and/or programs within a single computer or between devices and/or separate computers over a network. The term "network" includes, but is not limited to, packet-switched networks such as local area networks, wide area networks (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

In accordance with one or more examples of this disclosure, after selection of a single communication channel for the associated home network, access to the shared communication channel relies on a multiple access methodology identified as Collision Sense Multiple Access (CSMA). CSMA is a distributed random-access methodology for sharing a single communication medium, by having a contending communication link back off and retry access a prospective collision on the wireless medium is detected, i.e. if the wireless medium is in use. In accordance with one or more examples of this disclosure, communications on the single communication medium are identified as "simplex" meaning, one communication stream from a single source node to one or more target nodes at one time, with all remaining nodes capable of "listening" to the subject transmission. Starting with the IEEE 802.1 1ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with single antenna single stream or multiple-antenna multi-stream transceivers concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

As noted, aspects of this disclosure pertain to channel state information. Throughout this disclosure, the term "channel state information" (CSI) includes information pertaining to a state of a wireless channel between a transmitter and receiver. CSI, in addition to a transmission matrix (H), can include meta-information about a link from which data is extracted, e.g. bandwidth, channel, signal strength, and spatial streams. In accordance with one or more examples of this disclosure, post-processing is used to remove known and/or estimated and/or calibrated transmitter and/or receiver effects on a given transmission. Within this disclosure, the adjective "CSI-enabled" refers to devices, such as mobile phones, which are configured to determine CSI which has been obfuscated or concealed. Authorized access to CSI can enable advantageous applications for motion detection including, for example, WLAN diagnosis, home security, health care monitoring, smart home utility control, elder care, automotive tracking and monitoring, and the like. However, unauthorized access to CSI can threaten both digital and physical privacy and security at a location.

In accordance with one or more examples of this disclosure, CSI is obfuscated before it is transmitted in unprotected parts of wireless frames, such as training fields of preambles of WiFi® communications.

At least one technical benefit of examples of this disclosure is that an eavesdropper can be prevented from obtaining accurate CSI information about a network. At least one technical benefit of examples of this disclosure is that an eavesdropper can be prevented from inferring the occupancy or motion at a home or office by overhearing transmitted packets.

In accordance with one or more examples of this disclosure, time-varying precoding is used to secure CSI. In at least one example an AP (access point), such as a router, and a station (STA), such as a mobile phone, perform a handshake to setup a secure CSI session. Throughout this disclosure, an AP will often be a WAP. The term "secure CSI session" includes a communications relationship between two or more devices in which some or all CSI is hidden, obfuscated, occluded, shielded or the like. In some examples, a secure CSI session can be initiated by user action or by automatic network state detection. Parameters of a secure session can be established during initialization of a communications session. Initialization can include seed and/or key generation for encrypted packets. Initialization can include sharing of precoding and decoding parameters for obfuscating and de-obfuscating CSI.

In accordance with one or more examples of this disclosure, a transmitter pre-encodes CSI with a time varying precoder matrix (P) from a codebook known to a receiver, but unknown to eavesdroppers. In at least one example of this disclosure, an eavesdropper will be unable to infer that a precoder matrix (P) has been applied to a transmission matrix (H) emitted by the transmitter. While the receiver undoes the effect of the precoder before using the CSI (by applying $P^{-1}$ to PH), the eavesdropper will mistake the matrix of PH for the actual channel state information. In accordance with one or more examples of this disclosure, precoder matrixes (P), are applied in a time-dependent manner to emulate motion by the transmitter. In at least one example of this disclosure, one or more communications transmitted from the transmitter are obfuscated such that an eavesdropper will mistake a transmitting AP for a transmitting STA.

In accordance with one or more examples of this disclosure, an AP can track motion patterns associated with devices in the AP's operational environment and applying precoder matrixes (P) which will emulate such motion to an eavesdropper later so that the emulated motion does not match the actual activity occurring at the operational environment.

In accordance with one or more examples of this disclosure, precoder matrixes are applied to the preambles of one or more data packets. In accordance with one or more examples of this disclosure, precoder matrixes are applied to headers of one or more data packets.

In accordance with one or more examples of this disclosure, the motion imprinted in each of the links between multiple STAs and an AP are coordinated to simulate movement by multiple persons (their STAs) in the operational environment of the AP.

In accordance with one or more examples of this disclosure, an AP can be configured to emit secure CSI when the AP and/or the AP's server and/or the AP's controller and/or a cloud connection of the AP detects that the operational environment (e.g., home, office) of the AP is empty of other electronic communications devices such as STAs.

In accordance with one or more examples of this disclosure, an AP can be configured to emit secure CSI when the AP and/or the AP's server and/or the AP's controller and/or a cloud connection of the AP detects that an electronic communications device is present in the operational environment of the AP when none would normally be present, and/or when a previously unidentified STA enters the operational environment. In some examples, an AP can be configured to emit secure CSI when an external sensor (e.g., a camera, proximity sensor, trigger wire) coupled to the AP and/or the AP's server and/or the AP's controller and/or a cloud connection of the AP, indicates that an eavesdropper is present in the operational environment.

In accordance with one or more examples of this disclosure, the risk of unauthorized and/or undesired disclosure of CSI by an electronic communications device is reduced by adaptively obfuscating packet preambles to shield or mask location activity information from being detectable from preamble data of communications. In accordance with one or more examples of this disclosure, a secure CSI engine of an electronic communications device is used to adaptively obfuscate such preambles. The CSI security engine can be used in various modes such as an activity emulation mode, an activity protection mode, and an activity masking mode. In at least one example, when a location is unoccupied, the CSI security engine can emulate activity in unprotected preamble transmission data to provide false information that there is activity at the location. In some examples, the emulated activity can indicate one or more persons are moving around a location. The emulated activity can include a series of different paths and reflections to avoid unnatural patterns of human behavior.

In some examples of this disclosure, activity protection can include securing the preamble header information to prevent an eavesdropper from accessing the preamble while allowing authorized devices access to the preamble. Various activity protection schemes can coordinate simultaneous, asynchronous, periodic, triggered, etc. access by authorized devices to the preamble. Securing the preamble header can be implemented, for example, with periodic authorization periods or pre-shared codebooks to allow for normal authentication and joining of the network by authorized devices. In some examples, activity masking can hide or replace some of the preamble information to make eavesdropping ineffective. For example, activity masking can include providing preamble information calculated to cause an eavesdropper to make inaccurate inferences about channel state.

In at least one example of this disclosure, a secure CSI engine component (e.g., circuit) of an electronic communications device can be used to reduce the ability of authorized network-users to snoop on activity by other users in the AP's operational environment. In some examples, each training sequence sent to one or more STAs by an AP will have a different precoder matrix (P) applied.

In accordance with one or more examples of this disclosure, application of specific precoding matrixes (P) occurs in accordance with a schedule agreed between a transmitting device and a receiving device. Throughout this disclosure, electronic communications devices can be configured to operate as both a transmitting device and a receiving device.

In accordance with one or more examples of this disclosure, precoder matrixes can be configured to emulate activity or hide activity in the operational environment of an AP, such as a local area network.

In accordance with one or more examples of this disclosure, a secure CSI engine masks beacon information when no electronic devices have interacted with a beacon within a predetermined amount of time. In at least one example, an AP can be configured to cease precoding during a given time or upon a given user action (such as pressing a button on a router). In at least one example temporary cessation of precoding can provide time for a new device become authorized to access a network of the AP.

In at least one example of this application, an AP comprises a VLSI processor. In some examples, an AP is coupled, through a modem, to a cable, fiber or digital subscriber backbone connection to the Internet to support wireless communications, e.g. IEEE 802.11 compliant communications, on a WLAN. The WiFi® stage includes a baseband stage, and the analog front end (AFE) and Radio Frequency (RF) stages. In the baseband portion wireless communications transmitted to or received from each user/client/station are processed. The AFE and RF portion handles the up-conversion on each of transmit paths of wireless transmissions initiated in the baseband. The RF portion also handles the down-conversion of the signals received on the receive paths and passes them for further processing to the baseband.

In accordance with examples of this disclosure, an AP and/or STA can support multiple protocols and multilingual with the ability to communicate with multiple protocols, for example Internet of Things protocols including Bluetooth-Low-Energy, Zigbee, Thread, etc. and communicatively coupled to one or more resources for access to analytics or machine-learning capabilities. In some examples, an AP and/or station is battery powered and/or mobile and/or integrated with a larger mobile device such as an automobile or airplane.

One or more examples of this disclosure include a multiple-input multiple-output (MIMO) apparatus supporting N·N discrete communication streams over N antennas. In various examples, the value of N can be 4, 6, 8, 12, 16, etc.

In one or more examples of this disclosure, data packets for wireless transmission on a transmit path to one or more stations is framed in a framer. Streams of one or more data packets can be encoded and scrambled by an encoder and scrambler. In at least one example, streams are interleaved and mapped by an interleaving mapping unit of an AP. Streamed data can be spatially mapped with a spatial mapping matrix by a spatial mapping unit of an AP. In at least one example, spatially mapped data are input to Inverse Discrete Fourier Transform (IDFT) components for conversion from the frequency domain to the time domain before transmission. An IDFT component can be coupled to a transmit path of a MIMO antenna.

Figure 1:
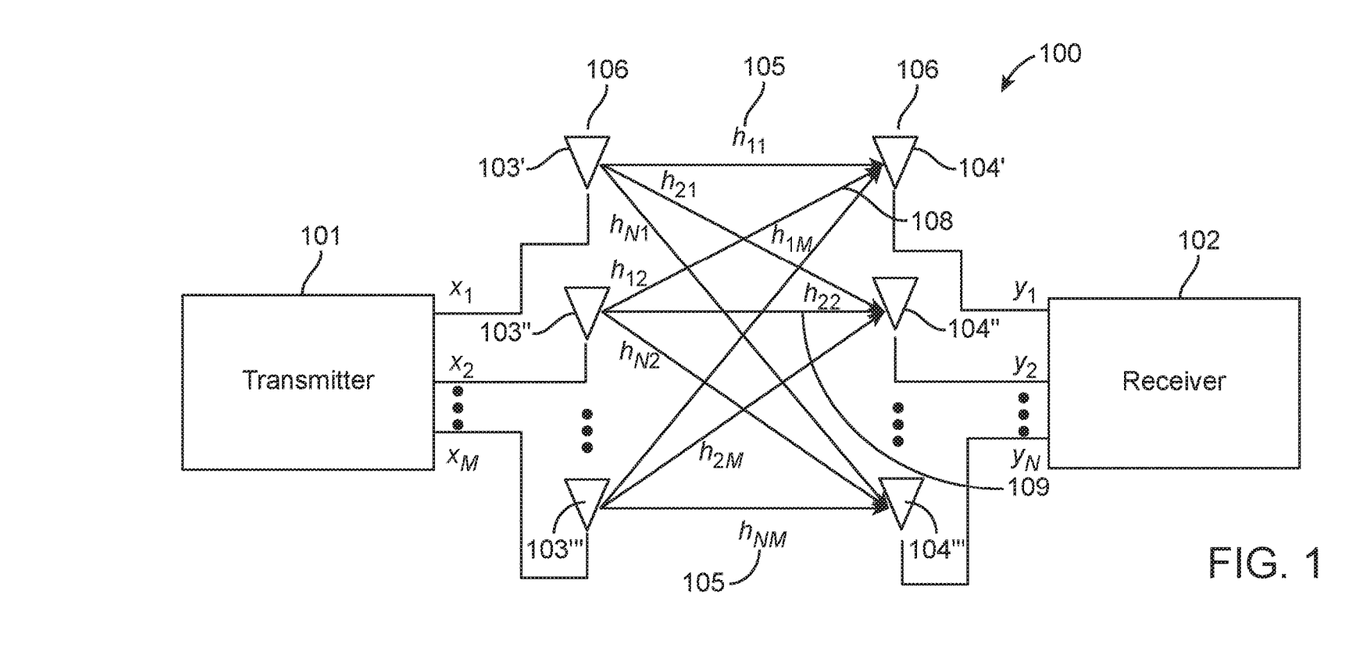
FIG. 1 illustrates an operational environment of a transmitter and a receiver, in accordance with an example of this disclosure.

FIG. 1 illustrates an operational environment 100 of a transmitter 101 and a receiver 102, in accordance with an example of this disclosure. In FIG. 1, multiple data streams 105 are multiplexed over M transmit antennas 103 and received by N receive antennas 104. The multiple data streams 105 collectively form a channel 106. Such factors as the positions of individual transmit antennas 103 and individual receive antennas 104, signal strength and unintended coupling of individual transmit antennas 103 and individual receive antennas 104 can affect the state of the channel 106. Because the state of the channel 106 can vary considerably over time, such as when, for example, transmitter 101 moves relative the receiver 102, or when one or more antennas of an additional electronic communications device begin to interact with those of the transmitter 101 and/or receiver 102. Each receive antenna 104 receives not only the direct signal 108 intended for the receive antenna 104, but some portion of the signal sent along a different data stream (e.g., 109). In accordance with at least one example of this disclosure, a way to adapt to frequent changes in channel state is for electronic devices such as the receiver 102 to adjust how they interpret data received over one or more data streams 105. For example, if a signal of a known strength is transmitted, but a receive antenna 104 detects that signal as having a different strength, the receiver 102 can interpret signals received at the second strength as having been transmitted at the first strength by adding the difference to the received signal.

In at least one example of this disclosure, a transmitter 101 transmits training data, which is a series of predetermined values, and the receiver 102 determines the state of the channel 106 by how much the received values differ from the training data. In at least one example of this disclosure, training data is included in one or more training packets. In at least one example of this disclosure, a particular set of training data can be transmitted at a predetermined time. In accordance with at least one example of this disclosure, a particular set of training data can be included in a data packet in which a header of the data packet indicates that the data packet contains training information. If training data is sent frequently enough to enable the receiver 102 to keep up with changes in the state of the channel 106, the receiver 102 will continue to be able to adapt to changes in the state of the channel 106 and thus continue to be able to receive and accurately interpret data packets sent over the data streams 105. In accordance with at least one example of this disclosure, the data packets sent over the data streams 105 are encrypted. In accordance with at least one example of this disclosure, an unauthorized device is not able to decrypt the encrypted packets because the device lacks the key(s) necessary to decode the encrypted packets, but can perhaps derive from the fact that the channel state has changed that the transmitter 101 and/or the receiver 102 have changed positions. The corollary of this principle is that the unauthorized device can derive that the transmitter 101 and the receiver 102 have not changed positions because the channel state has remained relatively constant over a length of time.

In accordance with at least one example of this disclosure, before sending the training data, the transmitter 101 will modify the training data, such as by multiplying the values of the training data by a matrix having a value which is known to the transmitter 101 and the receiver 102, but which is unknown to an unauthorized device. In accordance with at least one example of this disclosure, the unauthorized device will mistakenly infer from the modified training data that the state of the channel 106 has changed. In accordance with at least one example of this disclosure, the training data will be modified in a manner such that the unauthorized device will be deceived into incorrectly determining that the transmitter 101 and/or the receiver 102 have moved or are moving.

Figure 2:
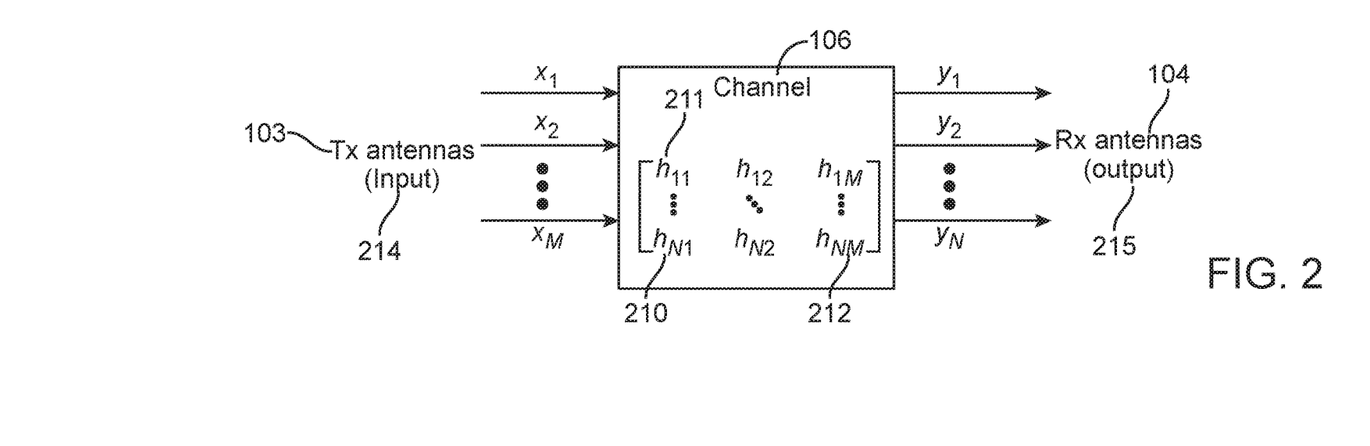
FIG. 2 illustrates a channel matrix for the transmitter and receiver of FIG. 1.

FIG. 2 illustrates a channel response for the receiver 102, expressed as a channel matrix H 210. Channel matrix H 210 represents the channel conditions between the transmitter 101 and the receiver 102. The direct path between transmit antenna 103' and receive antenna 104' is represented by channel response h11 (211). The channel response of the path between transmit antenna 103' and receive antenna 104" is h21 and so on through $h_{NM}$ (212). Channel matrix H 210 has N rows and M columns. Receiver 102 has an associated receiver response (y=Hx+n) based on the channel matrix H 210, in which x is an input 214 vector and n is a noise vector. The receiver 102 solves for x based on the receiver response which, as noted above, requires that the values of transmission matrix 210 be known. Correctly solving for x, the data 214 transmitted by the transmitter 101 using the transmit antennas 103 is the data output 215 received by the receiver 102.

Figure 3:
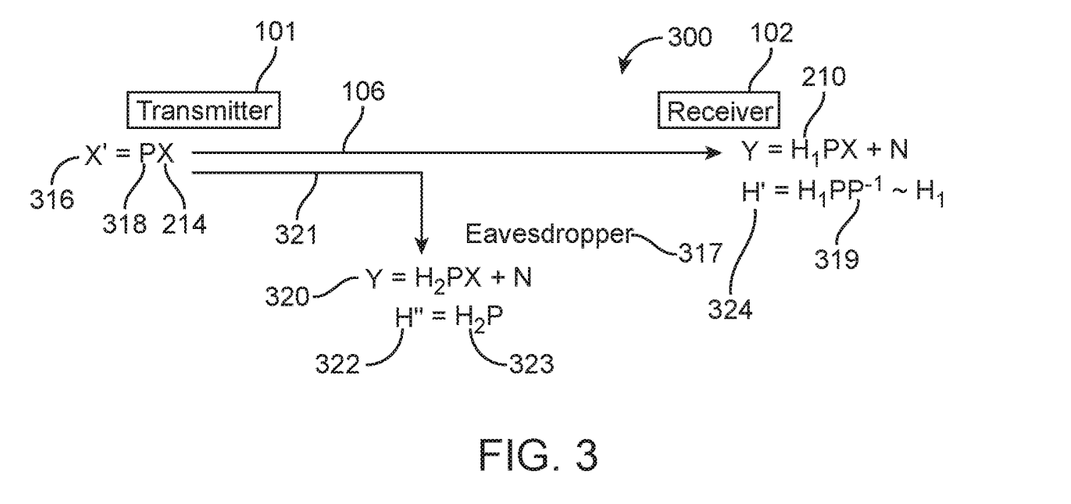
FIG. 3 illustrates an operation environment like that of FIG. 1, except that an eavesdropper is present.

FIG. 3 illustrates an operational environment 300 like that of FIG. 1, in which transmitter 101 conveys input information 214 to receiver 102, but now an eavesdropper 317 is present and can detect data streams (103) sent over channel 106. In order to mislead the eavesdropper 317, prior to transmission, the input information 214 (X) is multiplied by precoder matrix (P) 318 and then transmitted as transmit data X' 316. As noted, for receiver 102 to properly interpret received signal Y so as to solve for X, the channel matrix H 210 for the channel 106 between the transmitter 101 and the receiver must be known (or estimated with sufficient accuracy). In FIG. 2, receiver 102 can correctly estimate channel matrix H' 324 based on $H_1$, because in solving for X in Y=$H_1$PX, receiver applies decoder matrix $P^{-1}$ 319 (inverse of P 318). Eavesdropper 317 also has a receiver response 320, and being at a different location from receiver 102, forms a different channel 321 with transmitter 101. Unlike receiver 102, eavesdropper 317 is unaware that the information X 214 has been multiplied by matrix (P) 318 prior to transmission as X' 316. When eavesdropper 317 attempts to determine channel conditions $H_2$ 323, eavesdropper 317 is unaware that precoder matrix P 318 is present and mistakenly determines that the channel conditions of channel 321 are H" ($H_2$P) 322. In at least one example of this disclosure, one or more precoder matrixes P (e.g., 318) are applied to underlying information 214 before transmission such that the apparent changes in channel conditions between the transmitter 101 and the eavesdropper 317 are consistent with the transmitter 101 having changed location.

Figure 4:
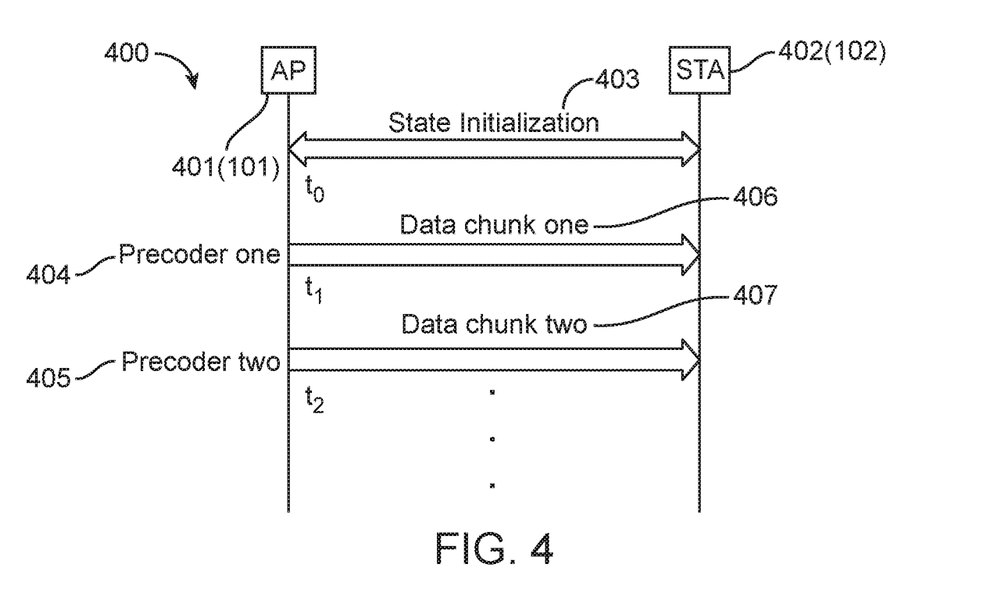
FIG. 4 is a timing diagram for an interaction between the transmitter and receiver of FIGS. 1-3.

FIG. 4 is a timing diagram for an interaction 400 between transmitter-access point 401 (101) and receiver-station (STA) 402 (102). At time to AP 401 and STA 402 share 403 initialization information between each other. Initializing 403 can include agreeing when and for how long one or more predetermined precoder matrixes (P) will be included in transmitted data X' (316). At $t_1$, AP 401 sends data chunk one 406 to STA 402. Data chunk one 406 bears precoder matrix (P), "Precoder one" 404. At $t_2$, AP 401 sends data chunk two 407 to STA 402. Data chunk two 407 bears precoder matrix (P) (318), "Precoder two" 405.

Figure 5:
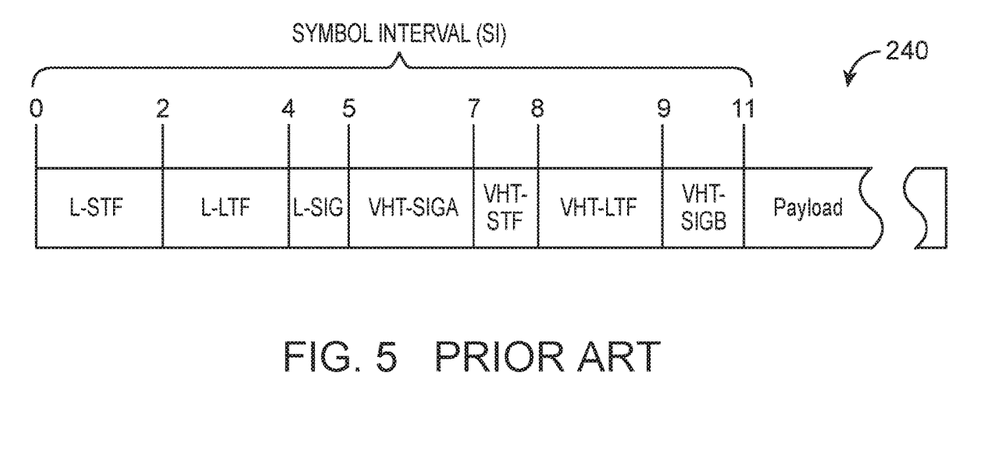
FIG. 5 is a Prior Art packet diagram of a transmitter packet with a preamble field.

FIG. 5 is a Prior Art packet diagram of a transmitter packet with a preamble field that is used for channel estimation. FIG. 5 illustrates an example header of a VHT frame. Some portions of the frame, including the L-LTF and VHT-LTF, can be used to estimate the channel in the frequency domain by a receiver since a fixed known baseband sequence is used to generate these fields. For other types of frames such as HT or HE, HT-LTF or HE-LTF fields can likewise be used. In another example implementation, pilots present throughout the frame in known time and frequency locations can be used too. In another example, the mid-amble of the frame can be used for channel estimation too. Any training or known part of the frame can be used for estimating the channel. FIG. 5 includes packet 240 and the corresponding symbol interval (SI) required to transmit each field. The header includes a legacy portion containing the L-STF, L-LTF and L-SIG fields and a very high throughput portion containing the VHT-SIGA, VHT-STF, VHT-LTF and VHT-SIGB fields. The payload portion contains no user data. The legacy (L), long (LTF) and short (STF) training and signal (SIG) fields are compatible with stations supporting the IEEE 802.11n or earlier standards. The remaining signal and training fields are intended for very high throughput (e.g., IEEE 802.11ac compliant devices). The VHT-SIGA field contains information on the MCS and number of streams of the sounding. The VHT-STF field is used for automatic gain control (AGC). The VHT-LTF field (e.g., the channel estimation), includes a long training sequence used for MIMO channel estimation by a receiver.

Figure 6:
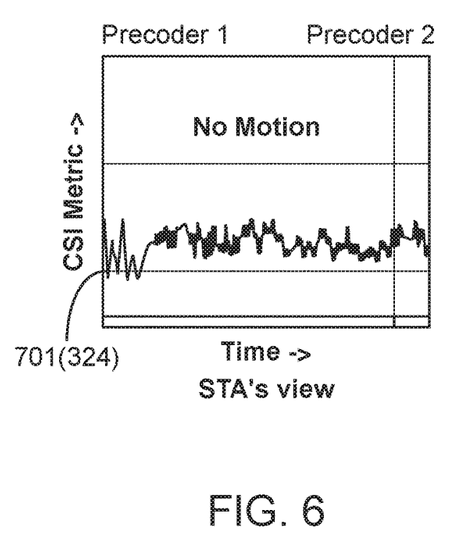
FIG. 6 illustrates the receiver's view of channel state information of the transmitter of FIGS. 1-5.

FIG. 6 illustrates the STA's (402) view of the STA's (402) CSI. Because STA (402) properly applies decoder matrixes $P^{-1}$ (319) to data chunk one (406) and data chunk two (407) of FIG. 4, the CSI 701 (e.g., 324) for the channel (106) between the AP (401) and the STA (402) is relatively invariant, which is consistent with both AP (401) and STA (402) being stationary at $t_1$ and $t_2$. The CSI 701 as seen by STA (402), corresponds to correct channel information H (210).

Figure 7:
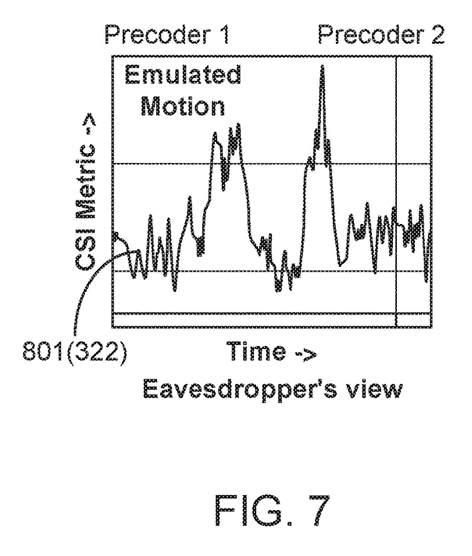
FIG. 7 illustrates an eavesdropper's view of channel state information of the transmitter of FIGS. 1-6.

FIG. 7 illustrates an eavesdropper's (317) view of CSI 801 of the AP (401). Unlike the CSI 701 shown in FIG. 6, the CSI 801 (e.g., 322) for the channel (106) between the eavesdropper (317) and the AP (401) appears to fluctuate significantly in the same time frame, because eavesdropper (317) does not know to multiply the eavesdropper's (317) receive response Y (320) by an appropriate $P^{-1}$ to negate the effects of precoder one (404) and precoder two (405). The fluctuations emulate motion by AP (401).

Figure 8:
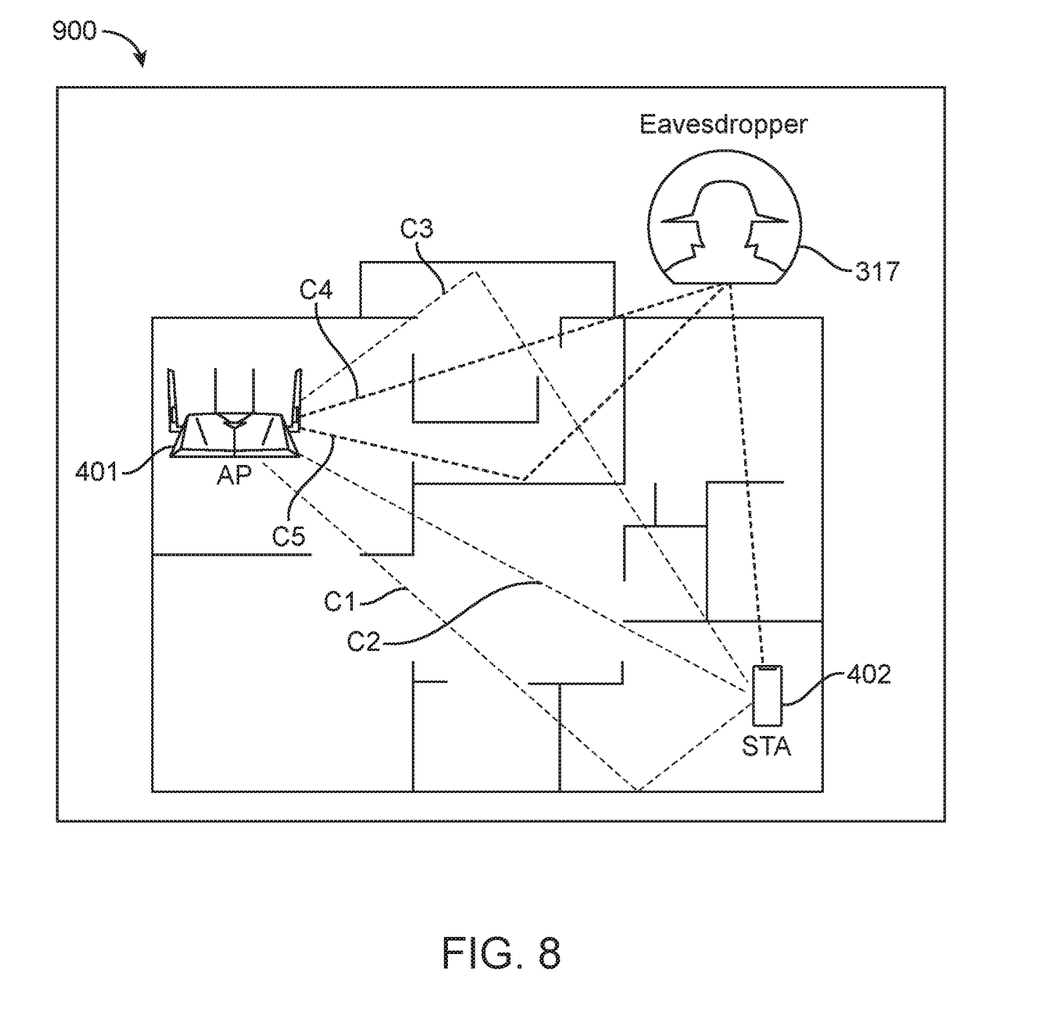
FIG. 8 illustrates an operational environment in which transmissions between a transmitter, multiple receivers, and an eavesdropper contain channel state information, in accordance with an example of this disclosure.

FIG. 8 illustrates an operational environment 900 in which transmissions C1, C2 and C3 between AP 401 and STA 402, transmissions C4 and C5 from AP 401 to eavesdropper 317, and transmission C6 from STA 402 to eavesdropper 317 contain CSI (701, 801) bearing an obfuscation matrix P (e.g., 318).

Figure 9:
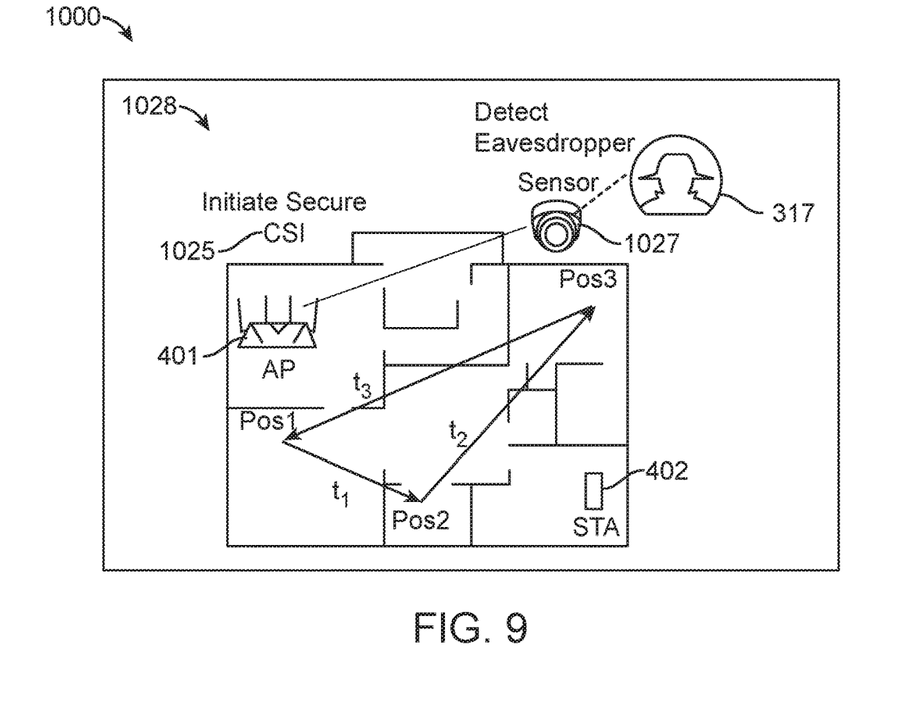
FIG. 9 illustrates an operational environment in which an eavesdropper is detected by a sensor, in accordance with an example of this disclosure.

FIG. 9 illustrates an operational environment 1000 in which an eavesdropper 317 is detected. In at least one example of this disclosure, the eavesdropper 317 is detected by the sensor 1027, and the presence of the eavesdropper 317 is communicated directly to AP 401, which serves as the hub of local network 1028. In at least one example of this disclosure, the presence of the eavesdropper 317 is communicated to AP 401 through the cloud. In at least one example of this disclosure, AP 401 determines that the eavesdropper 317 is present by performing a deep packet inspection for one or more indicators in sensor traffic. In response to the detection of the eavesdropper 317, AP 401 initiates 1025 (403) CSI protocols. CSI (e.g., 801) can be used to emulate motion by the AP 401 and/or STA 402 from position Pos1 to position Pos2 at time $t_1$, from position Pos2 to position Pos3 time $t_2$, and from position Pos3 to position P2 at time $t_3$.

Figure 10:
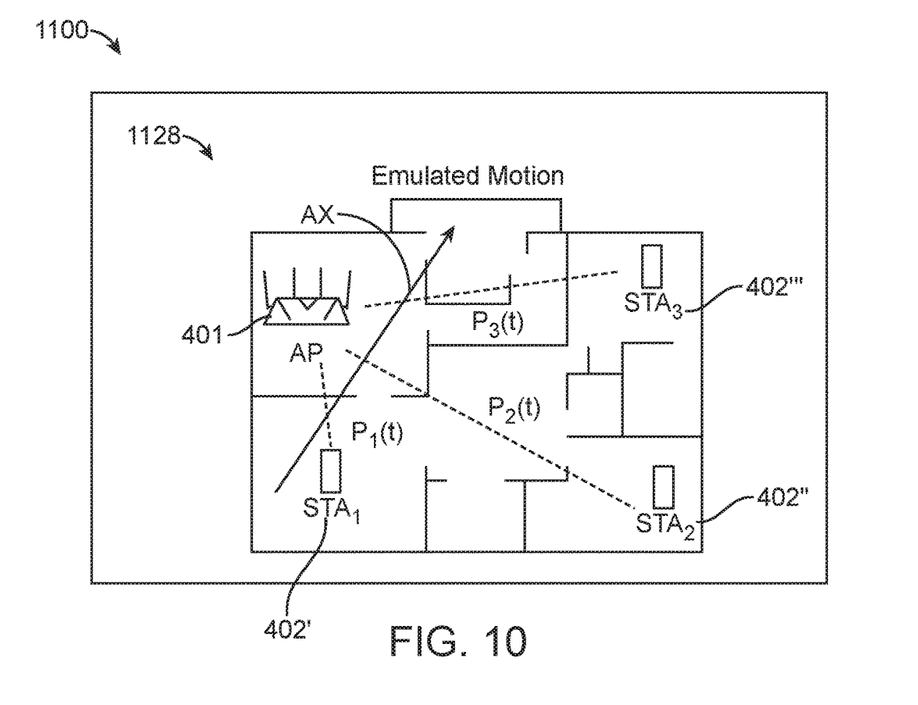
FIG. 10 illustrates an operational environment in which motion is imprinted in links of multiple receivers to emulate coordinated motion amongst the multiple receivers.

FIG. 10 illustrates an operational environment 1100 in which multiple CSI-enabled STA1 (402'), STA2 (402''), and STA3 (402''') are present in local network 1128. In FIG. 10, motion imprinted in each of links P1(t), P2(t), P3(t) are coordinated to emulate concurrent movement by CSI-enabled STA1, CSI-enabled STA2, and CSI-enabled STA3, such as along axis of advance AX. In accordance with at least one example of this disclosure, if an eavesdropper (317) (unauthorized listening device) listens to P1(t), P2(t), P3(t), it will appear to the eavesdropper (317) that a single device is moving along axis of advance AX. In at least one example, the emulated motion (e.g., along axis of advance AX) is represented in three different precoder sets (316) during a time in which an eavesdropper (317) monitors local network 1128.

In some examples of this disclosure, an electronic device (e.g., STA 402) which is authorized to communicate in a network (e.g., local network 1128) will not be provided with all precoding matrix information for the network. In such a situation, the authorized device could be misled about the presence or absence of other moving devices in the network.

In at least one example of this disclosure, different keys are generated for each link between the AP 401 and the STA 402. A device (e.g., 402') which would properly know motion data for a network—such as a STA (e.g., 402') belonging to the homeowner who owns the network AP (e.g., 401)—requires such keys and the frequency hopping sequence of the network to get an accurate picture of the state of motion in the network.

Figure 11:
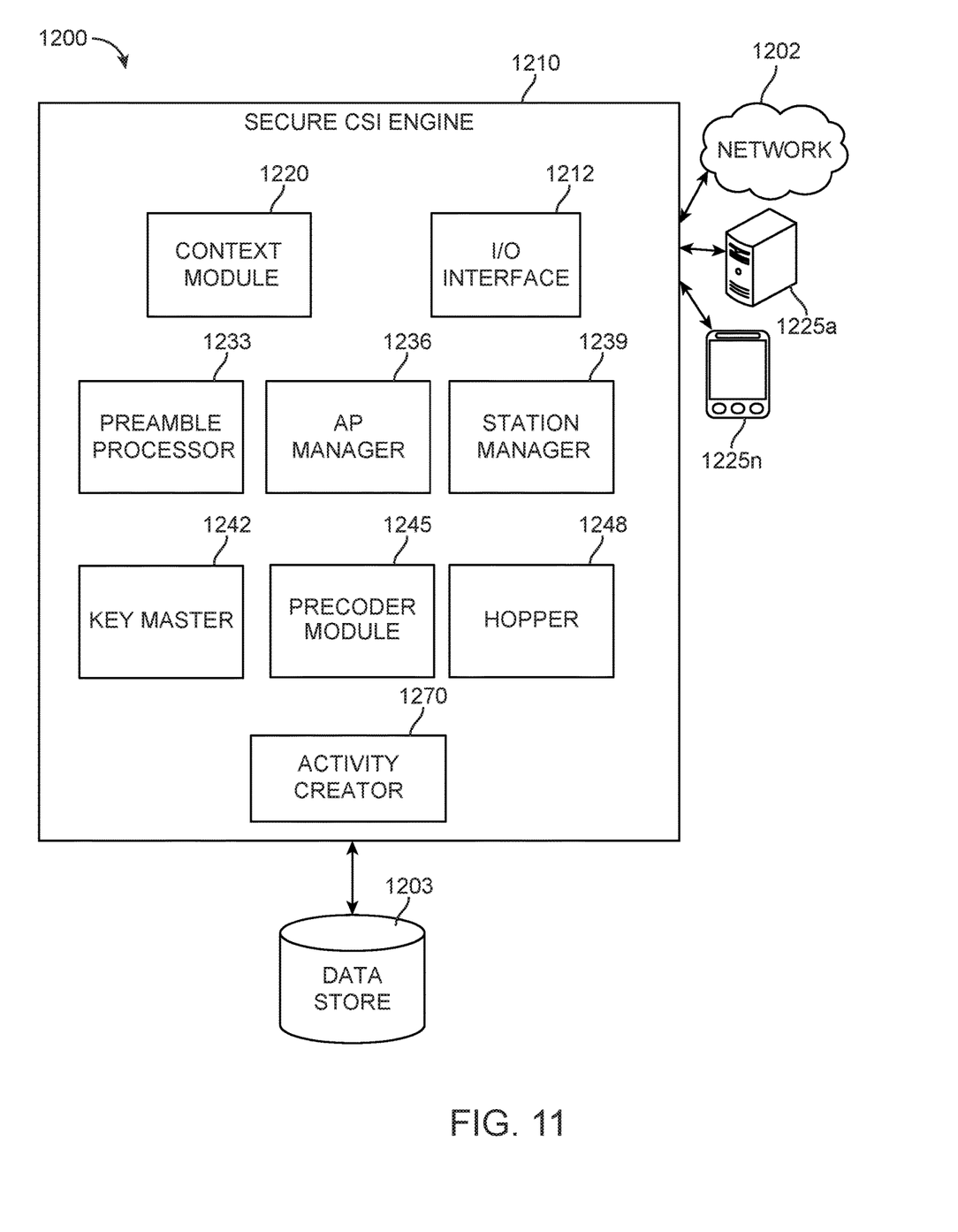
FIG. 11 illustrates blocks of an implementation, in accordance with an example of this disclosure.

FIG. 11 illustrates a computing device 1200 (e.g., AP 401), in accordance with an example of this disclosure. Computing device 1200 is coupled to data store 1203, network 1202, remote computing device 1225a, and STA 1225n (e.g., 402). Computing device 1200 comprises a secure CSI engine 1210. The secure CSI engine 1210 comprises privacy and security module 1215, context module 1220, input/output interface 1212, preamble processor 1233, AP manager 1236, station manager 1239, key master 1242, precoder 1245, hopper 1248, and activity creator 1270. Context module 1220 causes computing device 1200 to emulate motion in certain contexts. In at least one example of this disclosure, the context module 1220 will emulate motion when the number of devices in a coupled to the computing device 1200 falls above or below a threshold. In at least one example of this disclosure, the context module 1220 will emulate motion when a new device is detected by the computing device 1200. In another instance the context module 1220 receives instructions from a cloud controller or a sensor or from deep inspection of data in the network to trigger the CSI obfuscation. The input/output interface 1212 enables the computing device 1200 to communicate with one or more other electronic devices, or in an instance to communicate with a cloud controller. The preamble processor 1233 determines which part of a preamble (503) should be included in a data packet and interacts with precoder module 1245 as necessary to modify a training sequence of the header (504, 505) of a packet. AP manager 236 and/or station manager 1239 to initialize secure communications between one or more APs (401) and one or more STAs (402) and handshake a pre-determined hopping sequence when obfuscation is triggered. Key master module 1242 maintains and tracks public and/or private encryption keys for encrypting communications between the computing device 1200 and one or more electronic devices. Precoder module 1245 multiplies the training sequence by the time varying precoder matrix P (318). Hopper 1248 fetches the next precoding sequence P (e.g., 318) for application to transmit data (e.g., 316) as determined from the initialization sequence and the AP manager 1236 and/or station manager 1239.

Activity creator 1270 triggers the computing device 1200 to emulate motion and/or transmit otherwise unnecessary data packets if the amount of activity in the network 1202 in which the computing device 1200 resides falls below a threshold for a predetermined amount of time or when triggered by the context module 1220. In at least one example, activity creator 1270 protects and masks existing activity.

Figure 12:
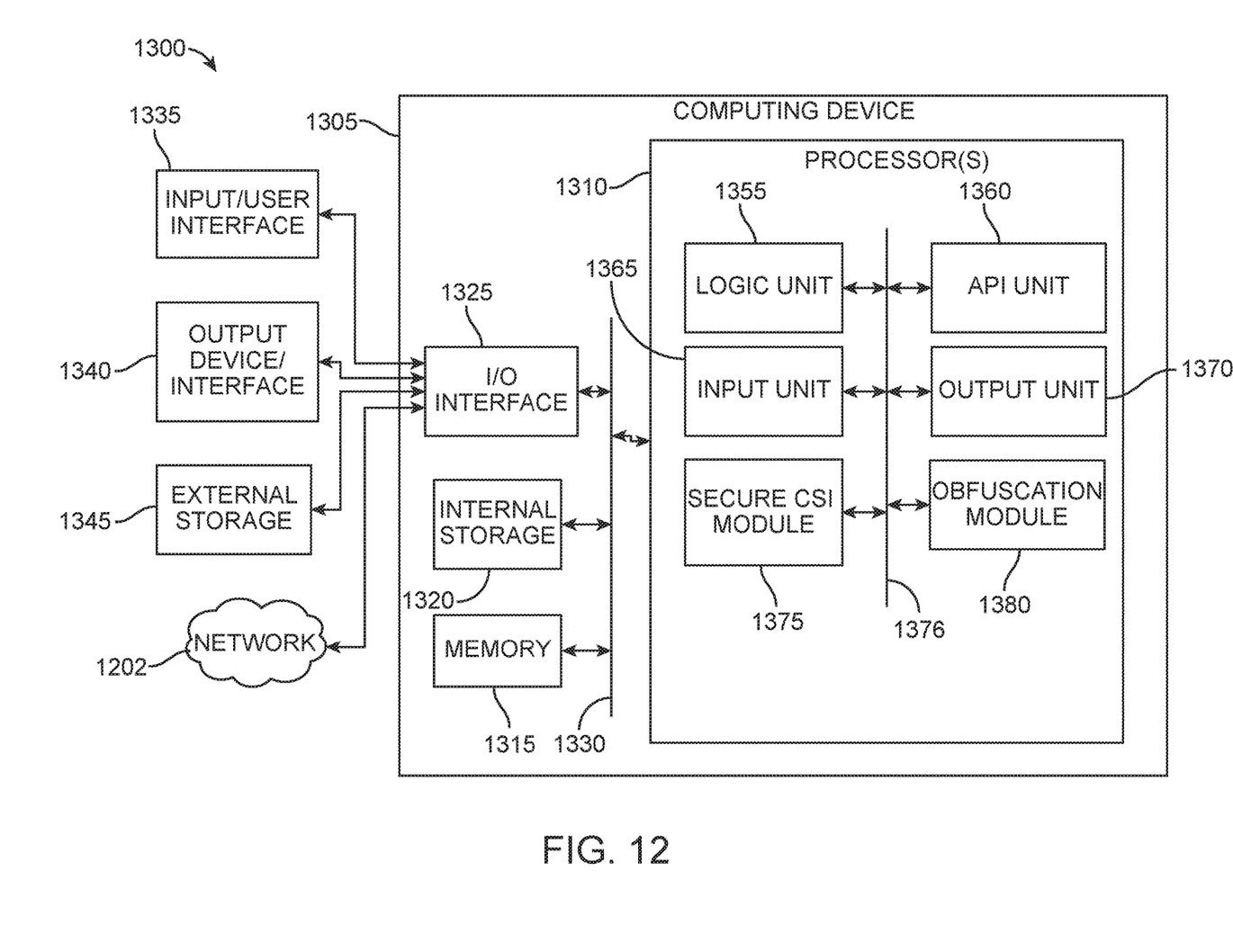
FIG. 12 illustrates blocks of another implementation, in accordance with an example of this disclosure.

FIG. 12 illustrates an operational environment 1300 of a computing device 1305, in accordance with an example of this disclosure. The computing device 1305 can be used to practice methods of this disclosure. The computing device 1305 comprises an input/output interface 1325, an internal storage 1320 and a memory 1315 communicatively coupled to one or more processors 1310 through a system bus 1330. Processor 1310 comprises a logic unit 1355, an input unit 1365, a secure CSI module 1375, an application programming interface unit 1360, an output unit 1370 and an obfuscation module 1380 which are communicatively coupled through an internal bus 1376. Computing device 1305 is communicatively coupled to an input/user interface 1335, an output device/interface 1340, an external storage 1345 and a network 1202. To enable user interaction with computing device 1305, input/user interface 1335 represents any number of input mechanisms, such as a microphone for speech, a touch-sensitive screen for gesture or graphical input, keyboard, mouse, motion input, speech and so forth. Output device/interface 1340 can comprise one or more output devices and/or interfaces with such devices. In accordance with at least one example of this disclosure, multimodal systems enable a user to provide multiple types of input (e.g., 214) to communicate with computing device 1305. External storage 1345 can include one or more data stores from which data such as updates for computing device 1305 can be retrieved. Network 1202 represents one or more communications networks such as a wireless local area network (e.g., 1128) and the internet. Input/output interface 1325 represents one or more wired and/or wired connections between computing device 1305 and input/user interface 1335, output device/interface 1340, external storage 1345, and network 1202. Secure CSI module 1375 and obfuscation module 1380 can control or be configured to control the processor 1310 to perform various actions. The memory 1315 can include multiple different types of memory with different performance characteristics. Logic unit 1355 can include an arithmetic logic unit for performing arithmetic and logical operations for computing device 1305. Input unit 1365 can include one or more circuits configured to regulate input to processor 1310 received through input/output interface 1325. Output unit 1370 can include one or more circuits configured to regulate output from processor 1310 to input/user interface 1335, output device/interface 1340, external storage 1345, network 1202, input/output interface 1325, internal storage 1320, and memory 1315 through system bus 1330. Application programming interface unit 1360 can include one or more application programming interfaces describing protocols for communications between computing device 1305 and one or more remote devices over network 1202. The processor 1310 can include any general-purpose processor and a hardware module or software module, such as secure CSI module 1375 and obfuscation module 1380. Processor 1310 can comprise a special-purpose processor in which the processor incorporates specific software. In at least one example of this disclosure, processor 1310 comprises a completely self-contained computing system, containing multiple cores or processors, a bus, memory controller, cache, etc. The system bus 1330 and the internal bus 1376 may be any of several types of bus structures including a memory bus or memory controller, a peripheral bus, and a local bus using any of a variety of bus architectures. A basic input/output system (BIOS) stored in memory 1315 or the like, may provide the basic routine that helps to transfer information between elements within the computing device 1305, such as during start-up. Internal storage 1320 can include storage devices such as a hard disk drive, a magnetic disk drive, an optical disk drive, tape drive or the like. Internal storage can include software modules for controlling the processor 1310.

The input/output interface 1325 generally governs and manages user input and processor 1310 output. There is no restriction for examples of this disclosure to operate on any particular hardware arrangement and therefore the basic features here may be substituted for improved hardware or firmware arrangements as they are developed.

A computing device (e.g., 1200, 401, 402) can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

In at least one example of this disclosure, emulation of movement or a random pattern can be achieved by introducing a time delay or phase shift between the different data streams fed into the separate antennas. In another example implementation the time delay or phase shift can be applied between spatial streams, space-time streams or I/Q stream of the data fed into the multiple antennas.

Figure 13:
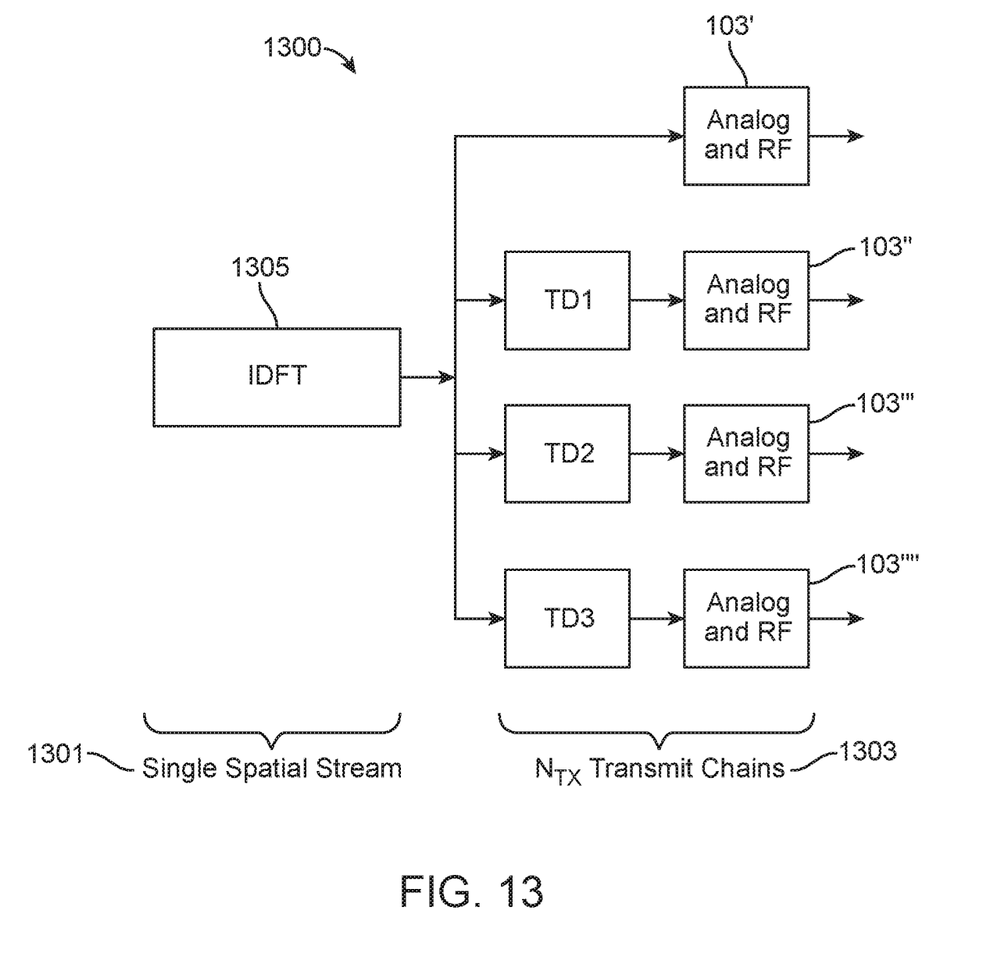
FIG. 13 illustrates blocks of another implementation, in accordance with an example of this disclosure.

FIG. 13 illustrates a transmission sequence 1300, in accordance with an example of this disclosure. A single spatial stream 1301 is output to multiple transmit chains 1303. In the example of FIG. 13, an inverse discrete Fourier transform 1305 is applied to the signal of the spatial stream 1301 before the spatial stream 1301 is sent to a plurality of antennas 103. In FIG. 13 a time delay (e.g., T1, TD2, TD3) or phase shift is introduced between the transmitter antennas 103. In at least one example, the time delay(s) or phase shift(s) are prearranged with an authorized (non-eavesdropping) receiver. The time delay or phase shift can be applied to an entire frame or just a header or a part of a header. (See FIG. 5.) The time delay (TD) or phase shift can be different between all antennas 103. The time delay and phase shift may vary over time. The sequence and timing of time delays and phase shifts is known to the receiver. In an example implementation, the sequence and timing of the time delays and phase shifts is shared with the receiver at the time of the link setup (see FIG. 4).

For clarity of explanation, the examples of FIGS. 11-13 are presented as including individual functional blocks. The functions these blocks represent may be provided through the use of either shared or dedicated hardware, including, but not limited to, hardware capable of executing software and hardware, such as processor 1310, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) for storing software performing the operations discussed below, and random-access memory (RAM) for storing results. Very large-scale integration (VLSI) hardware examples, as well as custom VLSI circuitry in combination with a general-purpose DSP circuit, may also be provided.

In examples of this disclosure, a computer-readable storage medium can include tangible media such as optical disks, magnetic disks, read-only memories, random access memories, solid state devices and drives, or any other types of tangible or non-transitory media suitable for storing electronic information. A computer readable signal medium may include mediums such as carrier waves. A non-transitory computer medium does not include carrier waves.

The example implementations are not described with reference to any particular programming language. A variety of programming languages may be used to implement teachings of this disclosure. The instructions of the programming language(s) may be executed by one or more processing devices, e.g., central processing units (CPUs), processors, or controllers.

One or more operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, can cause the processor to perform a method to carry out implementations of the present application.

The components and processes disclosed herein may be implemented singly or in combination by hardware, circuits, firmware, software, or a processor executing computer program code; The components and processes disclosed herein may be implemented coupled to the wireless transceiver's transmit and receive path components.

Further, some example implementations of the present application may be performed solely in hardware, whereas other functions may be performed solely in software. Moreover, the various functions described can be performed in a single unit or can be spread across several components in any number of ways. When performed by software, the methods may be executed by a processor, based on instructions stored on a computer-readable medium. The instructions can be stored on the medium in a compressed and/or encrypted format.

Various aspects and/or components of the described examples may be used singly or in any combination. The examples set forth in this disclosure are illustrative and explanatory. The scope of the inventions of this disclosure are set forth in the following claims.

What is claimed is:

1. A privacy-enhancing wireless communication method for use by a transceiver device, the method comprising:
    obtaining a frame preamble that includes a predetermined pattern enabling unauthorized detection of the transceiver device's movement or lack thereof via measurement of channel state information;
    modifying the predetermined pattern to include amplitude or phase distortion that masks said movement or lack thereof;
    transmitting a frame using the frame preamble with the modified pre-determined pattern;
    instructing two or more receiving devices to respond according to a schedule with frame preambles that include predetermined patterns adjusted with amplitude or phase distortions to concurrently mask the movement or lack thereof of said two or more receiving devices.

2. A privacy-enhancing wireless communication method for use by a transceiver device, the method comprising:
    obtaining a sequence of frames each having a preamble that includes a pre-determined pattern enabling unauthorized detection of the transceiver device's movement or lack thereof via measurement of channel state information;
    modifying the predetermined pattern of each frame preamble in the sequence to include amplitude or phase distortion that masks said movement or lack thereof, with at least some of the frame preambles having modified predetermined patterns with different amplitude or phase distortion from the modified pre-determined patterns of other frame preambles; and
    transmitting the sequence of frames using the frame preambles with the modified predetermined patterns.

3. The method of claim 2, wherein the amplitude or phase distortion varies between frames to falsely indicate movement of the transceiver device.

4. The method of claim 2, wherein the amplitude or phase distortion varies between frames to falsely indicate random movement of the transceiver device.

5. The method of claim 2, wherein the amplitude or phase distortion varies between frames to falsely indicate that the transceiver device is not moving.

6. The method of claim 2, wherein the amplitude or phase distortion varies between frames to falsely indicate communication from the transceiver device to another electronic device that is moving.

7. The method of claim 2, wherein the transceiver device is at least one of an access point, a station, a repeater, and a mesh node.

8. The method of claim 2, further comprising: instructing two or more receiving devices to respond according to a schedule with frame preambles that include predetermined patterns adjusted with amplitude or phase distortions to concurrently mask the movement or lack thereof of said two or more receiving devices.

9. The method of claim 2, wherein the predetermined pattern is a training sequence.

10. The method of claim 2, further comprising transmitting to a receiving device decoding parameters for operating on the frame preambles with the modified predetermined patterns to extract the channel state information.

11. The method of claim 2, wherein said modifying includes multiplying each predetermined pattern with a corresponding obfuscation matrix, and wherein the method further comprises coordinating with a receiving device before said modifying to determine which obfuscation matrix to use.

12. The method of claim 2, wherein said modifying includes multiplying each predetermined pattern with a corresponding obfuscation matrix, and wherein the obfuscation matrix varies according to time.

13. The method of claim 2, wherein said modifying includes introducing a time delay or a phase shift between antenna streams, and wherein a magnitude of the time delay or a magnitude of the phase shift varies according to time.

14. A wireless transmitter that comprises:
    one or more antennas;
    a processor coupled to the one or more antennas; and
    a memory storing instructions that when executed by the processor cause the processor to:

obtain a sequence of frames each having a preamble that includes a predetermined pattern enabling unauthorized detection of the wireless transmitter's movement or lack thereof via measurement of channel state information;

modify the predetermined pattern of each frame preamble in the sequence to include amplitude or phase distortion that masks said movement or lack thereof, with at least some of the frame preambles having modified predetermined patterns with different amplitude or phase distortion from the modified predetermined patterns of other frame preambles; and transmit the sequence of frames using the frame preambles with modified predetermined patterns.

15. The transmitter of claim 14, wherein the amplitude or phase distortion varies between frames to falsely indicate movement of the transmitter.

16. The transmitter of claim 14, wherein the amplitude or phase distortion varies between frames to falsely indicate random movement of the transmitter.

17. The transmitter of claim 14, wherein the amplitude or phase distortion varies between frames to falsely indicate that the transmitter is not moving.

18. The transmitter of claim 14, wherein the amplitude or phase distortion varies between frames to falsely indicate communication from the transmitter to another electronic device that is moving.

19. The transmitter of claim 14, wherein the instructions further cause the processor to: instruct two or more receiving devices to respond according to a schedule with frame preambles that include predetermined patterns adjusted with amplitude or phase distortions to concurrently mask the movement or lack thereof of said two or more receiving devices.

20. The transmitter of claim 14, wherein as part of modifying the pre-determined pattern, the instructions cause the processor to introduce a time delay or a phase shift between antenna streams, and wherein a magnitude of the time delay or a magnitude of the phase shift varies according to time.

* * * * *